(12) United States Patent
Koike et al.

(10) Patent No.: US 7,234,881 B2
(45) Date of Patent: Jun. 26, 2007

(54) MOLDING APPARATUS FOR A REINFORCEMENT RESIN COATING OF GLASS OPTICAL FIBER EXPOSING PORTION OF AN OPTICAL FIBER JUNCTION, METHOD FOR MOLDING REINFORCEMENT RESIN COATING OF A GLASS OPTICAL FIBER EXPOSING PORTION OF AN OPTICAL FIBER JUNCTION, AND OPTICAL FIBER CABLE

(75) Inventors: Rei Koike, Yokohama (JP); Kenji Io, Yokohama (JP); Tatsuo Saito, Yokohama (JP); Tomomi Moriya, Yokohama (JP); Yukio Nomura, Kyoto (JP); Yoshiji Sato, Yokohama (JP); Katsuichi Omori, Yokohama (JP); Yoshiharu Meguro, Yokohama (JP); Kazumasa Oishi, Yokohama (JP); Keiji Osaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 273 days.

(21) Appl. No.: 09/962,246

(22) Filed: Sep. 26, 2001

(65) Prior Publication Data
US 2002/0044749 A1 Apr. 18, 2002

(30) Foreign Application Priority Data
Oct. 13, 2000 (JP) .................................... P2000-313890

(51) Int. Cl.
*G02B 6/255* (2006.01)

(52) U.S. Cl. ............................ 385/96; 385/99; 385/95; 264/328.12; 264/261

(58) Field of Classification Search ............ 385/95–99, 385/80–84, 71; 264/494, 263, 328.12, 1.38, 264/492, 271.1, 261, 328.1
See application file for complete search history.

(56) References Cited

U.S. PATENT DOCUMENTS

| | | | | |
|---|---|---|---|---|
| 4,410,561 A | * | 10/1983 | Hart, Jr. | 427/513 |
| 4,627,942 A | | 12/1986 | Gagen et al. | |
| 4,629,285 A | * | 12/1986 | Carter et al. | 385/128 |
| 5,022,735 A | | 6/1991 | Dahlgren | |
| 5,093,048 A | * | 3/1992 | Kagan | 264/1.25 |
| 5,804,124 A | * | 9/1998 | Sata | 264/328.12 |

FOREIGN PATENT DOCUMENTS

| | | |
|---|---|---|
| DE | 34 09 920 | 9/1985 |
| EP | 0 206 545 | 12/1986 |
| JP | 56-123508 | 9/1981 |
| JP | 58 148728 | 9/1983 |
| JP | 57-151909 | 1/1984 |
| JP | 06/148452 | 5/1994 |
| JP | 06-148452 | 5/1994 |

* cited by examiner

*Primary Examiner*—Andrew Schechter
*Assistant Examiner*—Richard H Kim
(74) *Attorney, Agent, or Firm*—McDermott Will & Emery LLP

(57) ABSTRACT

A molding die 1 is constituted by an upper die 1a and a lower die 1b which are made of a material transparent to an ultraviolet light, and has a cavity 3 constituted by grooves 2c, 2d, whereas a resin injection gate 4 and a resin exit gate 7 are provided so as to communicate with the cavity 3. A junction of an optical fiber 10 is inserted into the cavity 3. A UV-curable resin is injected into the cavity 3 surrounding an exposing portion of the glass optical fiber 11 from the resin injection gate 4 positioned at one of coating ends of the optical fiber 10, whereas a part thereof is discharged from the resin exit gate 7 positioned at the other coating end. The ultraviolet light is emitted through the lower die 1b so as to cure the resin, thereby forming a reinforcement resin coating. As a consequence, bubbles can be prevented from occurring due to the residual air within the reinforcement resin coating in the junction of the optical fiber 10.

10 Claims, 12 Drawing Sheets

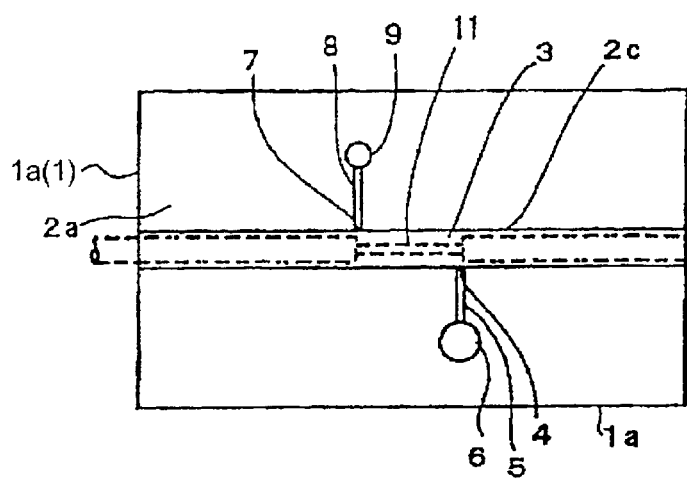
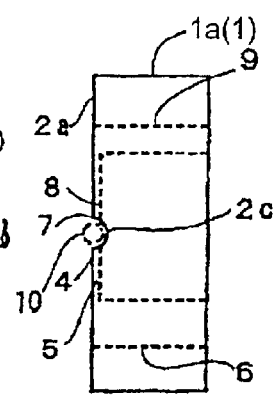
Fig.1A  Fig.1B
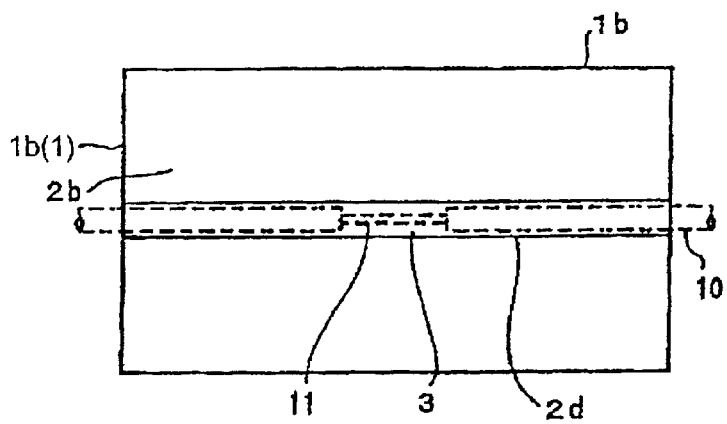
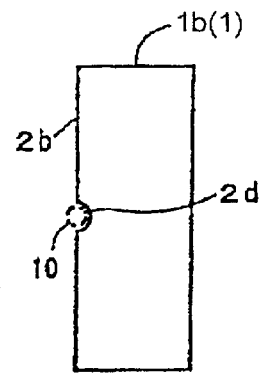
Fig.1C  Fig.1D

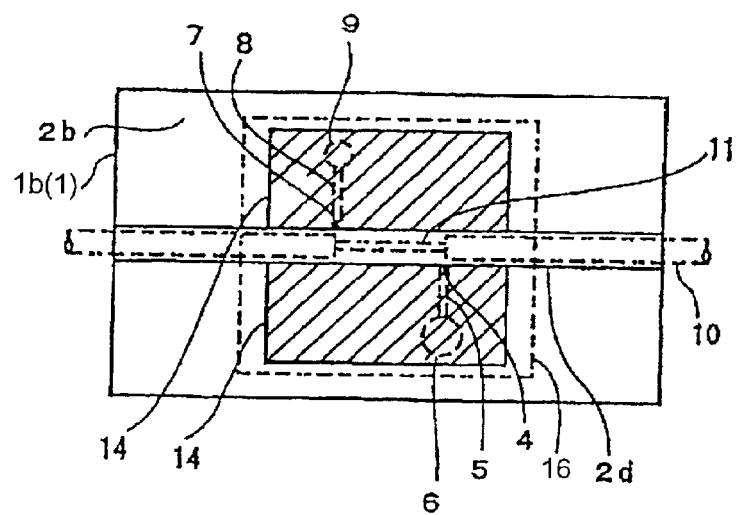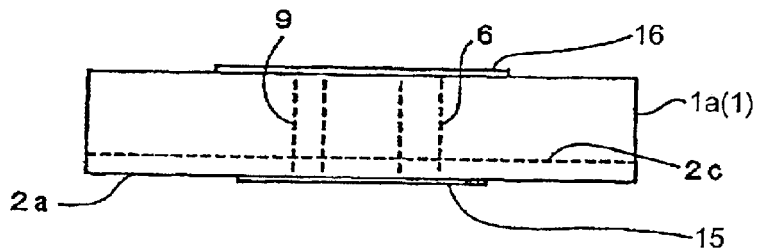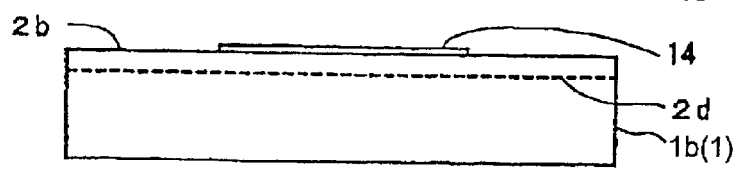

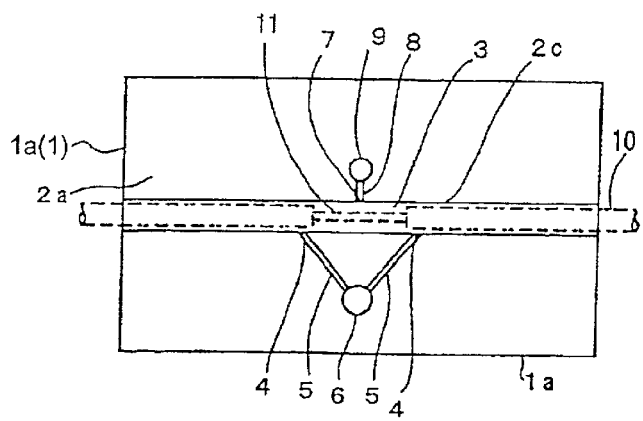 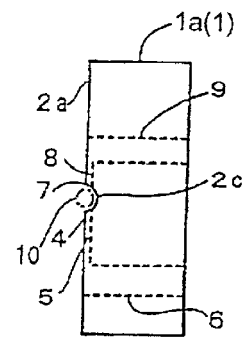
*Fig.7A* *Fig.7B*
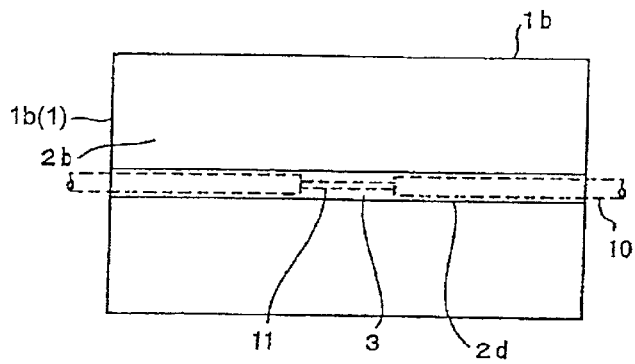 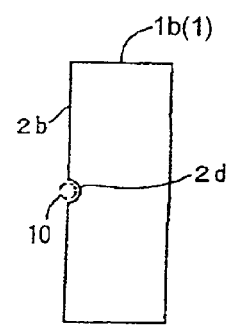
*Fig.7C* *Fig.7D*

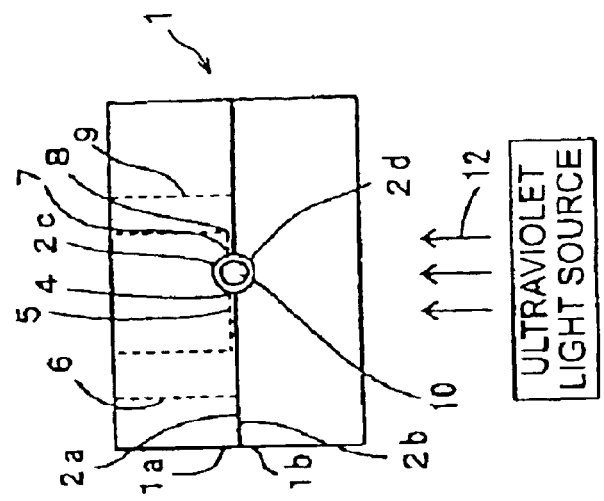
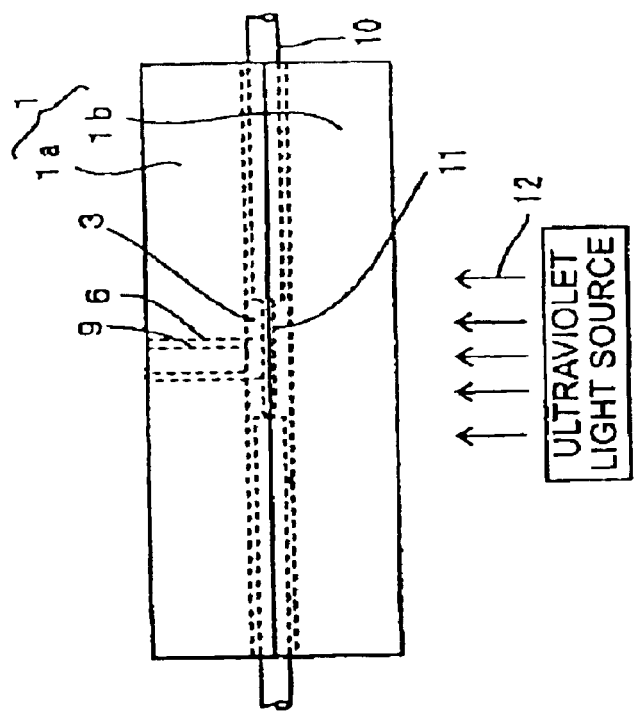

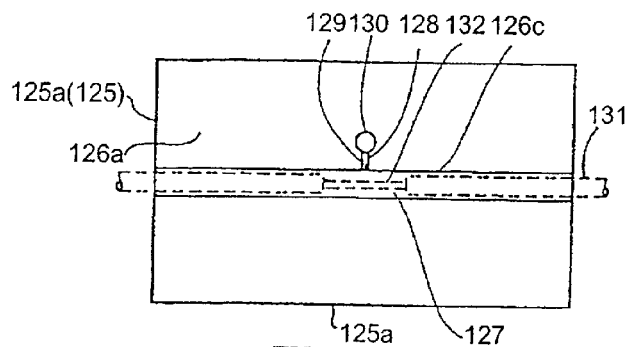
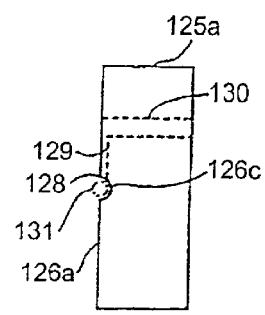
*Fig.12A*  *Fig.12B*
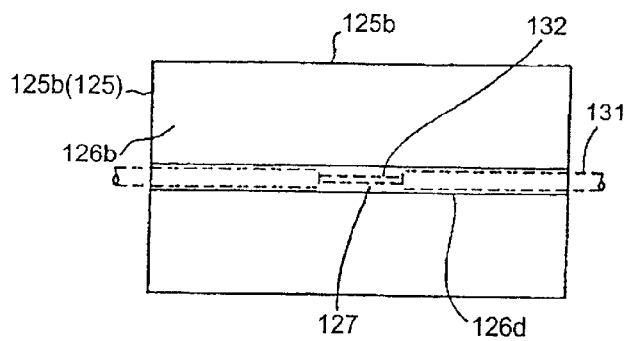
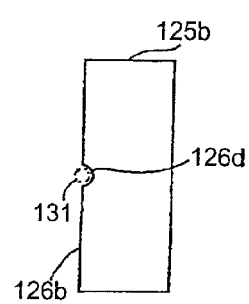
*Fig.12C*  *Fig.12D*
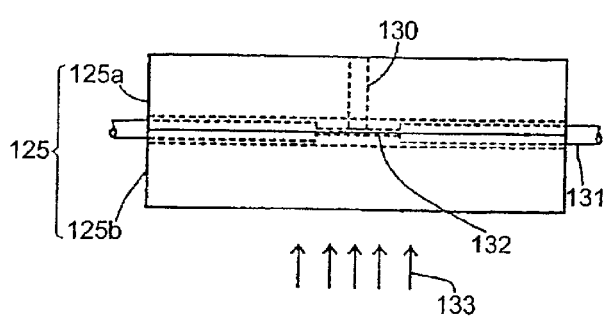
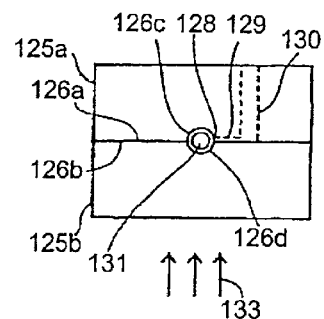
*Fig.12E*  *Fig.12F*

MOLDING APPARATUS FOR A REINFORCEMENT RESIN COATING OF GLASS OPTICAL FIBER EXPOSING PORTION OF AN OPTICAL FIBER JUNCTION, METHOD FOR MOLDING REINFORCEMENT RESIN COATING OF A GLASS OPTICAL FIBER EXPOSING PORTION OF AN OPTICAL FIBER JUNCTION, AND OPTICAL FIBER CABLE

BACKGROUND OF THE INVENTION

1. Field of the Invention

The present invention relates to a molding die used for molding a reinforcement resin coating of an optical fiber junction, a method of reinforcing the optical fiber junction using the same, and an optical fiber cable accommodating an optical fiber having this optical fiber junction.

2. Related Background Art

As an optical fiber accommodated in a submarine optical fiber cable and the like, continuous one having a long length is necessary. When a long-length continuous optical fiber is needed, optical fibers shorter than that are connected together to form it. The optical fibers are usually connected as follows. FIGS. 11A and 11B are perspective views for explaining a junction between optical fibers. FIG. 11A shows a state where glass optical fibers in optical fibers are fusion-spliced, whereas FIG. 11B shows a state where the junction is provided with a reinforcement resin coating. In FIGS. 11A and 11B, 121, 122, 123, and 124 indicate a optical fiber (a coated optical fiber), a glass optical fiber (a bare glass fiber without its coating is removed), fusion-splicing position, and reinforcement resin coating, respectively.

First, as shown in FIG. 1A, at end parts of two optical fibers 121, the coating of optical fibers 121 is removed so as to expose the glass optical fibers 122 in the optical fibers 121, and the end faces of two glass optical fibers 122 are butted against each other so as to carry out fusion splicing. The glass optical fiber exposing portions of two optical fibers have substantially the same length, so that the fusion-splicing position is located substantially at the center of the combined glass optical fiber exposing portion. Then, as shown in FIG. 11B, resin molding is effected on the exposing portion of the glass optical fibers 122, so as to form the reinforcement resin coating 124. The outer diameter of the reinforcement resin coating 124 is substantially the same as that of the optical fiber 121, so that the size of the junction does not hinder the optical fibers 121 from being accommodated in an optical fiber cable in particular.

When the coating of the optical fibers 121 is formed from a UV-curable resin, the reinforcement resin coating 124 is usually formed by a cured UV-curable resin as well. The reinforcement resin coating 124 is formed as follows. FIGS. 12A to 12F are views for explaining a molding die used for forming a reinforcement resin coating and a molding method. FIG. 12A is a plan view of the upper die as seen from its parting face side, whereas FIG. 12B is a side view of the upper die. FIG. 12C is a plan view of the lower die as seen from its parting face side, whereas FIG. 12D is a side view of the lower die. FIG. 12E is a front view showing the molding state, whereas FIG. 12F is a side view thereof.

In FIGS. 12A to 12F, 125, 125a, 125b, 126a and 126b, 126c and 126d, 127, 128, 129, 130, 131, 132, and 133 indicate the molding die, upper die, lower die, parting faces, grooves, cavity, resin injection gate, runner, sprue, optical fiber, glass optical fiber, and ultraviolet light, respectively.

The molding die 125 shown in FIGS. 12A to 12F is constituted by the upper die 125a and the lower die 125b. As shown in FIGS. 12A and 12B, along the parting face 126b, the upper die 125a is formed with the linear groove 126c having a semicircular lateral cross section, and has the resin injection gate 128 communicating with the groove 126c and the runner 129 and sprue 130 linked to the resin injection gate 128. As shown in FIGS. 12C and 12D, along the parting face 126b, the lower die 125b is formed with the linear groove 126d having a semicircular lateral cross section. The groove 126c of the upper die 125a and the groove 126d of the lower die 125b are aligned with each other such that the grooves 126c and 126d constitute the cavity 127 having a circular lateral cross section when they are clamped with their parting faces 126a, 126b opposing each other. The inner diameter of the grooves 126c, 126d, i.e., the inner diameter of the cavity 127 is about 250 µm in general.

The upper die 125a and lower die 125b of the molding die 125 are made of silica glass so as to transmit the ultraviolet light therethrough. In each of FIGS. 12A to 12D, the state where the optical fiber 131 having an exposing portion of the glass optical fiber 132 is inserted is depicted with imaginary lines as well. The inserted optical fiber 131 usually has an outer diameter of about 245 µm, whereas the glass optical fiber 132 has an outer diameter of about 125 µm.

In the following manner, the reinforcement resin coating is formed at the junction between optical fibers 131 by using the molding die 125 shown in FIGS. 12A to 12D. At end parts of two optical fibers 131, the coating is removed, so as to expose the glass optical fibers 132, and the end faces of the glass optical fibers 132 are fusion-spliced to each other. Thus combined glass optical fiber 132 is inserted into the cavity 127 formed by the grooves 126c, 126d, and the upper die 125a and lower die 125b are clamped together. Subsequently, a UV-curable resin is injected from the sprue 130 through the runner 129 and resin injection gate 128 into a void surrounding the glass optical fiber 132 within the cavity 127, so that the void is filled therewith. Then, the ultraviolet light 133 is emitted toward the lower die 125b from therebelow, and the ultraviolet light 133 transmitted through the lower die 125b cures the injected UV-curable resin.

Meanwhile, the resin having entered the void surrounding the glass optical fiber 132 within the cavity 127 from the resin injection gate 128 flows toward both sides of the longitudinal direction within the cavity 127, whereby the void is filled therewith to the vicinity of the coating of the optical fiber 131. At this time, there is a slight gap between the surface of the optical fiber 131 and the inner wall faces of the grooves 126c, 126d since the outer diameter of the optical fiber 131 is about 245 µm, whereas the inner diameter of the grooves 126c, 126d is about 250 µm. Usually, the air pushed away to the vicinity of the coating of the optical fiber 131 due to the injection of the UV-curable resin is expelled to the outside through the above-mentioned gap, whereby the void is completely filled with the UV-curable resin to the vicinity of the optical fiber 131. Though a part of the UV-curable resin reaches the gap between the coating of the optical fiber 131 and the grooves 126c, 126d, this gap is very small, whereas the resin has a viscosity, so that the resin extends along the coating of the optical fiber 131 and does not protrude to the outside of the optical fiber 131, whereby the resin intrudes into the gap by only several millimeters at most.

If the gap between the optical fiber 131 and the inner wall faces of the grooves 126c, 126d is narrowed due to the fluctuation in the outer diameter of the optical fiber 131 and the like, however, the air may not completely be expelled from the gap. In this case, the air may remain near the coating of the optical fiber 131 on both sides thereof, whereby bubbles may occur in the vicinity of both end parts of the reinforcement resin coating. While the UV-curable resin is injected into the cavity 127 from a resin supply apparatus, which is not depicted, by way of the sprue 130, runner 129, and resin injection gate 128, the air may be caught at the front end portion of the resin flow in the course of injection, whereby the resin at the front end portion may attain a state including bubbles. Since the vicinity of ends of the coating is filled with the front end portion of the resin flow, bubbles are likely to occur in the vicinity of ends of the coating not only due to the air remaining without being expelled but also due to the air caught into the resin in the course of resin flow.

When an optical fiber is used as being accommodated in a submarine optical fiber cable, the optical fiber receives a large lateral pressure. If bubbles exist within the reinforcement resin coating, the lateral pressure may compress the bubbles, thereby deforming the reinforcement resin coating, by which the glass optical fiber therein may be bent minutely, so that the optical fiber may increase its transmission loss. Therefore, it is desired that no bubbles exist within the reinforcement resin coating.

Since the upper die 125a and lower die 125b are made of silica glass, the clamping pressure at the time of clamping cannot be made as high as that in the case of dies made of a metal. Consequently, a slight gap may occur between the parting faces 126a, 126b upon clamping as well. The UV-curable resin injected into the cavity 127 may seep into the gap and cure as it is, thereby forming a hardened fin-like object extending in a direction perpendicular to the surface of the reinforcement resin coating. The fin-like object attached to the surface of the reinforcement resin coating becomes an obstacle when carrying out an operation for further providing an outer coating on the connected optical fibers and the like, whereby it is necessary to shave off the fin-like object. Though the fin-like object is usually shaved off with a razor, it is necessary that the operation be carried out carefully, which takes considerable time and labor.

SUMMARY OF THE INVENTION

The present invention provides a molding die which is configured such that no bubbles remain within a reinforcement resin coating in an optical fiber junction, a method of reinforcing the optical fiber junction using the same, and an optical fiber cable accommodating an optical fiber including the optical fiber junction formed thereby. Also, the present invention provides a molding die which can prevent fin-like objects from being formed on the surface of the reinforcement resin coating.

The molding die in accordance with the present invention is a molding die constituted by upper and lower dies at least one of which is made of a material transparent to an ultraviolet light, the molding die having a cavity constituted by grooves of the upper and lower dies linearly penetrating therethrough along respective parting faces thereof, each groove having a semicircular lateral cross section, the molding die being provided with a resin injection gate and a resin exit gate communicating with the cavity.

As mentioned above, at least one of the upper and lower dies in the molding die in accordance with the present invention is made of a material transparent to the ultraviolet light, a linear cavity having a circular lateral cross section is formed along the parting faces of the upper and lower molds, whereas the resin injection gate arranged near one of the coating ends of the optical fiber junction and the resin exit gate arranged near the other coating end communicate with the cavity. Therefore, when the UV-curable resin is injected from the resin injection gate, whereas the air and the front end portion of the resin flow are discharged from the resin exit gate, the void surrounding the glass optical fiber can completely be filled with the resin. As a result, no bubbles remain in the vicinity of coating ends of the optical fiber, whereby a reinforcement resin coating with no bubbles can be formed at the optical fiber junction.

Preferably, the resin injection gate is positioned near one of coating ends holding therebetween the glass optical fiber exposing portion of the optical fiber junction inserted into the cavity, whereas the resin exit gate is positioned near the other coating end.

In addition, when the parting face of said upper and lower dies are provided with a UV-light-blocking layer extending along the part of parting faces including a position in contact with the grooves in a segment including the resin injection gate and resin exit gate and the UV-light-blocking layer is not formed on the grooves, the part other than the grooves is not irradiated with the ultraviolet light. Consequently, even if the UV-curable resin seeps into the gap between the parting faces other than the grooves of the upper and lower dies, the resin will not cure, whereby this part of the resin can be taken out from the molding die in an uncured state. Since the uncured resin part can easily be wiped off with cloth and the like, no fin-like objects occur in the reinforcement resin coating.

Preferably, the resin injection gates are provided near coating ends holding therebetween a glass optical fiber exposing portion of an optical fiber junction inserted into said cavity respectively, whereas the resin exit gate is provided so as to communicate with the cavity located at the center between the resin injection gates at the two positions.

In addition, when the parting face of said die irradiated with said ultraviolet light is provided with a UV-light-blocking layer extending along a parting face part including a position in contact with the groove in a segment including the resin injection gates at two positions and the UV-light-blocking layer is not formed on the grooves, whereas the other die is provided with the resin injection gate, the resin exit gate, and a runner communicating with these gates, the UV-curable resin having entered the gap between the parting faces of the upper and lower dies and the UV-curable resin within the runner connected to the resin injection gate and resin exit gate are not irradiated with the ultraviolet light. As a consequence, this part of resin can be taken out from the molding die in the uncured state, whereby the uncured resin part can easily be wiped off with cloth and the like. Therefore, even if the resin enters the gap between the parting faces of the upper and lower dies, the resin will not cure, whereby no fin-like objects will occur in the reinforcement resin coating.

In the method of reinforcing an optical fiber junction in accordance with the present invention, an optical fiber part including a glass optical fiber exposing portion in which end faces of glass optical fibers exposed by removing a coating at end parts of two optical fibers are butted against each other so as to be fusion-spliced is inserted into the cavity of the molding die, a UV-curable resin is injected into a void surrounding the glass optical fibers within the cavity from a resin injection gate positioned near one coating end of the optical fiber junction, a part of a front end portion of a resin flow thereof is discharged from a resin exit gate positioned near the other coating end, and then an ultraviolet light is emitted through the die made of the UV-curable resin from the outside thereof, so as to cure the UV-curable resin injected into the cavity, thereby forming a reinforcement resin coating of the optical fiber junction. As a consequence, the resin flows from one coating end side of the optical fiber junction toward the other coating end side, so that the front end portions of the air and resin flow are expelled from the resin exit gate to the outside, whereby bubbles can be prevented from occurring within the reinforcement resin coating.

Alternatively, in the method of reinforcing an optical fiber junction in accordance with the present invention, an optical fiber part including a glass optical fiber exposing portion in which end faces of glass optical fibers exposed by removing a coating at end parts of two optical fibers are butted against each other so as to be fusion-spliced is inserted into the cavity of the molding die, a UV-curable resin is injected into a void surrounding the glass optical fibers within the cavity from two resin injection gates respectively positioned near coating ends on both sides of the glass optical fiber exposing portion, a part of a front end portion of the resin flow is discharged from a resin exit gate positioned at the center between the two resin injection gates, and then an ultraviolet light is emitted through the die made of the UV-curable resin from the outside thereof so as to cure the UV-curable resin injected into the cavity, thereby forming a reinforcement resin coating of the optical fiber junction. As a consequence, the resin flows from one coating end side of the optical fiber junction toward the other coating end side, so that the front end portions of the air and resin flow are expelled from the resin exit gate to the outside, whereby bubbles can be prevented from occurring within the reinforcement resin coating.

The optical fiber cable in accordance with the present invention is one accommodating therein at least one optical fiber having in a part thereof an optical fiber junction formed by the method of reinforcing the optical fiber junction.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a view showing an embodiment of the molding die in accordance with the present invention, which is a plan view of the upper die as seen from its parting face side;

FIG. 1B is a view showing the embodiment of the molding die in accordance with the present invention, which is a side view of the upper die;

FIG. 1C is a view showing the embodiment of the molding die in accordance with the present invention, which is a plan view of the lower die as seen from its parting face side;

FIG. 1D is a view showing the embodiment of the molding die in accordance with the present invention, which is a side view of the lower die;

FIG. 6A is a view showing an example in which the molding die in accordance with the present invention is provided with a UV-light-blocking layer and a UV-nonreflecting layer, which is a plan view of the lower die as seen from its parting face side;

FIG. 6B is a view showing an example in which the molding die in accordance with the present invention is provided with a UV-light-blocking layer and a UV-nonreflecting layer, which is a front view of the upper die;

FIG. 6C is a view showing the example in which the molding die in accordance with the present invention is provided with a UV-light-blocking layer, which is a front view of the lower die;

FIG. 7A is a view showing an embodiment of the molding die in accordance with the present invention, which is a plan view of the upper die as seen from its parting face side;

FIG. 7B is a view showing the embodiment of the molding die in accordance with the present invention, which is a side view of the upper die;

FIG. 7C is a view showing an embodiment of the molding die in accordance with the present invention, which is a plan view of the lower die as seen from its parting face side;

FIG. 7D is a view showing the embodiment of the molding die in accordance with the present invention, which is a side view of the lower die;

FIG. 8A is a front view showing a state where a reinforcement resin coating is molded by using the molding die shown in FIGS. 7A to 7D;

FIG. 8B is a side view showing the state where the reinforcement resin coating is molded by using the molding die shown in FIGS. 7A to 7D;

FIG. 12A is a view for explaining a molding die and molding method used for forming a reinforcement resin coating in accordance with prior art, which is a plan view of the upper die as seen from its parting face side;

FIG. 12B is a view for explaining the molding die and molding method used for forming a reinforcement resin coating in accordance with the prior art, which is a side view of the upper die;

FIG. 12C is a view for explaining the molding die and molding method used for forming a reinforcement resin coating in accordance with the prior art, which is a plan view of the lower die as seen from its parting face side;

FIG. 12D is a view for explaining the molding die and molding method used for forming a reinforcement resin coating in accordance with the prior art, which is a side view of the lower die;

FIG. 12E is a view for explaining the molding die and molding method used for forming a reinforcement resin coating in accordance with the prior art, which is a front view showing a molding state; and FIG. 12F is a view for explaining the molding die and molding method used for forming a reinforcement resin coating in accordance with the prior art, which is a side view showing the molding state.

DESCRIPTION OF THE PREFERRED EMBODIMENTS

Figure 2:
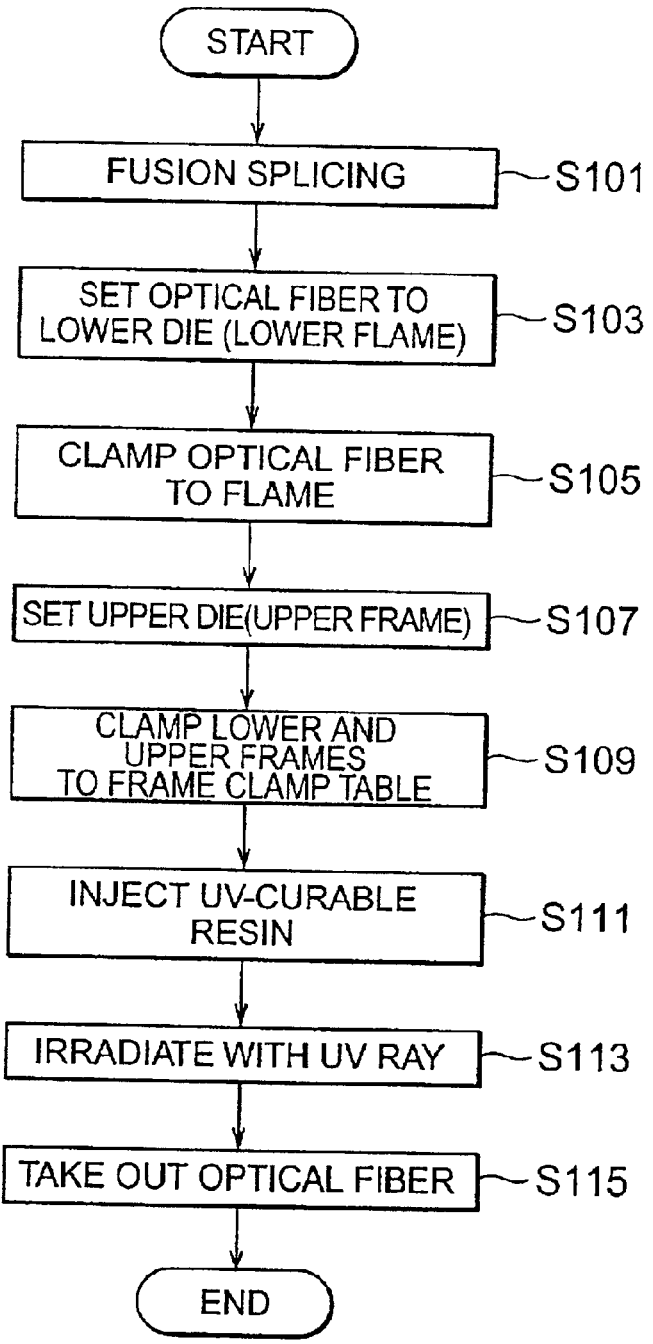
FIG. 2 is a flowchart for explaining an embodiment of the method of reinforcing an optical fiber junction in accordance with the present invention.

Embodiments of the molding die, method of reinforcing an optical fiber junction, and optical fiber cable in accordance with the present invention will be explained with reference to the drawings. In the explanation, constituents identical to each other or having functions identical to each other will be referred to with numerals or letters identical to each other without repeating their overlapping descriptions.

First, with reference to FIGS. 1A to 1D, an embodiment of the molding die in accordance with the present invention will be explained. In FIGS. 1A to 1D, 1, 1a, 1b, 2a and 2b, 2c and 2d, 3, 4, 5, 6, 7, 8, 9, 10, and 11 indicate a molding die, an upper die, a lower die, parting faces, grooves, a cavity, a resin injection gate, a runner, a sprue, a resin exit gate, a runner, a resin exit hole, an optical fiber (a coated optical fiber), and a glass optical fiber (a bare glass fiber without its coating is removed), respectively.

The molding die 1 is constituted by the upper die 1a and the lower die 1b, in which at least the lower die 1b is formed from a material transparent to ultraviolet lights, such as silica glass. In view of properties such as thermal expansion, it is desirable that the upper die 1a and lower die 1b be formed from the same material. Here, the upper die 1a and lower die 1b are expressions which are not used for indicating their vertical positional relationship but for simply distinguishing one of sectional dies from the other, whereby the upper and lower dies maybe arranged upside down or side by side as well.

The upper die 1a is provided with the linear groove 2c having a semicircular lateral cross section, whereas one resin injection gate 4 and at least one resin exit gate 7 are provided so as to communicate with the groove 2c. The runner 5 and sprue 6 are provided so as to communicate with the resin injection gate 4, whereas the runner 8 and the resin exit hole 9 are provided so as to communicate with the resin exit gate 7. Here, the runners 5 and 8 are disposed so as to extend along the parting face 2a. However, the arrangement of the runners 5 and 8, and the arrangement of the sprue 6 and resin exit hole 9 are not limited to the positions or forms shown in FIG. 1A.

The lower die 1b is provided with the linear groove 2d having a semicircular lateral cross section extending along the parting face 2b. The groove 2c in the upper die 1a and the groove 2d in the lower die 1b are aligned with each other such that they oppose each other when the upper die 1a and lower die 1b are clamped together with their respective parting faces 2a, 2b opposing each other. The hole having a completely circular lateral cross section constituted by the grooves 2c and 2d becomes the cavity 3. The inner diameter of the hole having a completely circular lateral cross section constituted by the grooves 2c and 2d is set constant. The grooves 2c and 2d are formed such that the inner diameter of the grooves 2c and 2d is greater by about several micrometers than the outer diameter of the optical fiber to be molded, such that the inner diameter of the cavity 3 is about 250 µm when the outer diameter of the optical fiber to be molded is about 245 µm.

When a reinforcement resin coating is to be molded by using this molding die 1, a junction of the optical fiber 10 is inserted into the cavity 3 as indicated by imaginary lines in FIGS. 1A to 1D. In conformity to the coating position of the optical fiber assumed to be inserted and the like, the resin injection gate 4 and resin exit gate 7 are provided. Namely, as shown in FIG. 1A, one resin injection gate 4 is positioned near one of the coating ends holding therebetween an exposing portion of the glass optical fiber 11 of the optical fiber 10 assumed to be inserted, whereas at least one resin exit gate 7 is positioned near the other coating end.

FIG. 1A shows a case where the number of resin exit gate 7 is one. Though the side on which the resin injection gate 4 is arranged and the side on which the resin exit gate 7 is disposed oppose each other with respect to the groove 2c in this case, they may be placed on the same side as well. In the case where the number of resin exit gate 7 is one, however, it is preferred in view of the clamping pressure balance that the resin injection gate 4 and the resin exit gate 7 be arranged on the sides opposite from each other with respect to the groove 2c. When there are two resin exit gates, the second resin exit gate may be positioned on the opposite side of the parting face 2a from the groove 2c so that the two resin gates hold the same coating end therebetween. The sizes of the resin exit gate 7, runner 8, and resin exit hole 9 are set appropriately in view of the viscosity of the resin and the like such that the pressure of the resin injected into the cavity 3 does not become too low.

Since the exposed length of the glass optical fiber 11 in the optical fiber junction has a fluctuation of about 1 mm, it is preferred that the distance between the resin injection gate 4 and the resin exit gate 7 be set in view of the fluctuation so as to match the maximum value of the exposed length. This is because of the fact that, if the resin injection gate 4 is positioned at one of the coating ends when the distance between the resin injection gate 4 and the resin exit gate 7 is shorter than the exposed length of the glass optical fiber 11, the resin exit gate 7 will be located on the inner side from the other coating end, whereby bubbles will be likely to remain between the resin exit gate 7 and the coating end.

On the other hand, setting the distance between the resin injection gate 4 and the resin exit gate 7 so that it matches the maximum value of the exposed length of the glass optical fiber yields a case where the distance between the resin injection gate 4 and the resin exit gate 7 is longer than the exposed length of the glass optical fiber. In this case, the resin injected into the void surrounding the glass optical fiber 11 from the resin injection gate 4 positioned at one of the coating ends completely fills the void to the other coating end, whereby the resin at the front end portion of the resin flow is discharged from the resin exit gate 7. Even when the resin exit gate 7 is located at a position slightly shifted toward the coating from the coating end, it will be no obstacle to the discharging of the resin since there is a slight gap between the inner wall face of the grooves 2c, 2d and the coating of the optical fiber 10.

With reference to FIG. 2, an embodiment of the method of reinforcing an optical fiber junction in accordance with the present invention will now be explained. FIG. 2 is a flowchart of the method of reinforcing an optical fiber junction according to one embodiment of the present invention.

First, at end parts of two optical fibers, optical fiber coatings are removed so as to expose glass optical fibers in the optical fibers, and end faces of the two glass optical fibers are butted against each other and fusion-spliced (S101). Here, the two optical fibers have substantially the same length of glass optical fiber exposing portion (e.g., 4 to 7 mm), such that the fusion-spliced position is located substantially at the center of the combined glass optical fiber exposing portion.

Figure 3A:
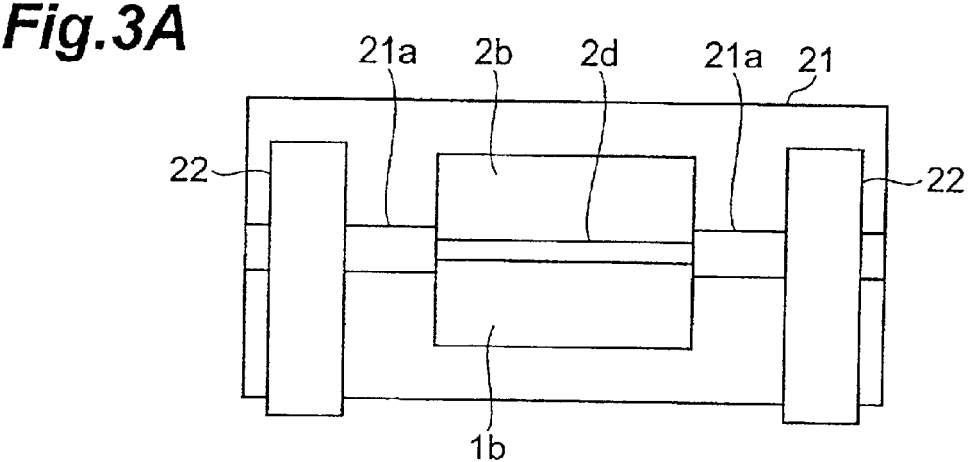
FIG. 3A is a view for explaining the embodiment of the method of reinforcing an optical fiber junction in accordance with the present invention, which is a plan view of the lower die as seen from its parting face side.

Subsequently, the fusion-spliced optical fiber is set to the lower die 1b (S103). At this time, the optical fiber is set such that the center position of the glass optical fiber exposing portion in the longitudinal direction substantially coincides with the center position of the groove 2d of the lower die 1b in the longitudinal direction. Here, as shown in FIG. 3A, the lower die 1b is assembled to the lower frame 21 while in a state where its position is adjusted. The lower frame 21 is provided with a groove 21a in which the optical fiber is disposed. Subsequently, the optical fiber is clamped to the lower frame 21 (lower die 1b) (S105). The optical fiber is clamped to the lower frame 21 by fiber clamps 22.

Figure 3B:
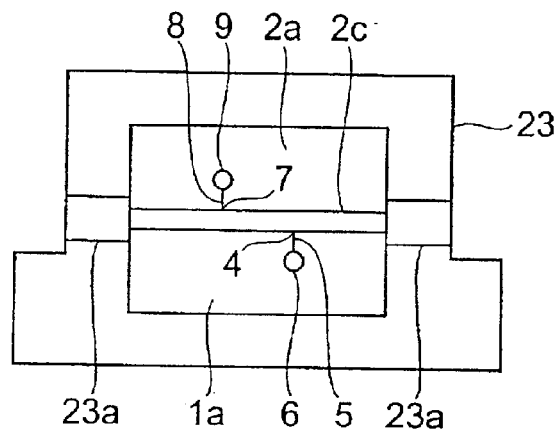
FIG. 3B is a view for explaining the embodiment of the method of reinforcing an optical fiber junction in accordance with the present invention, which is a plan view of the upper die as seen from its parting face side.
Figure 3C:
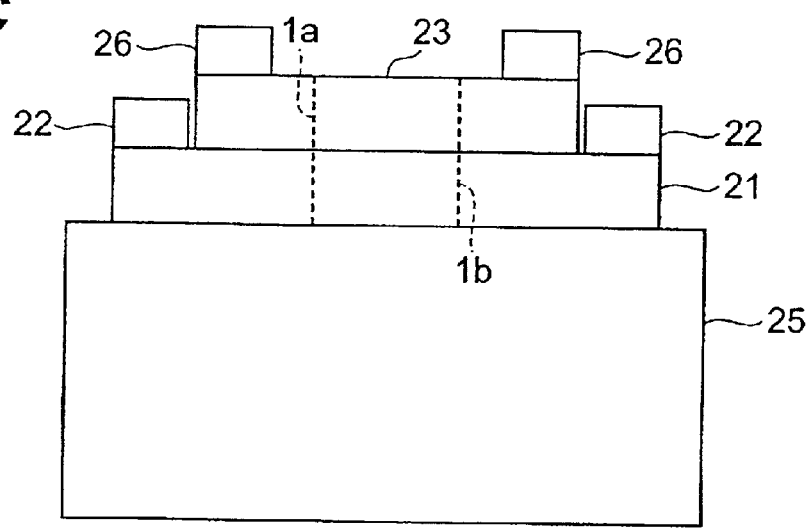
FIG. 3C is a front view for explaining the embodiment of the method of reinforcing an optical fiber junction in accordance with the present invention.
Figure 4B:
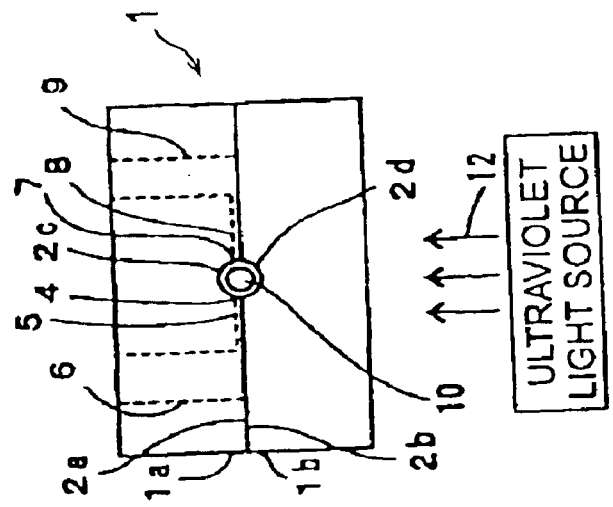
FIG. 4B is a side view showing the state where the reinforcement resin coating is molded by using the molding die shown in FIGS. 1A to 1D.
Figure 4A:
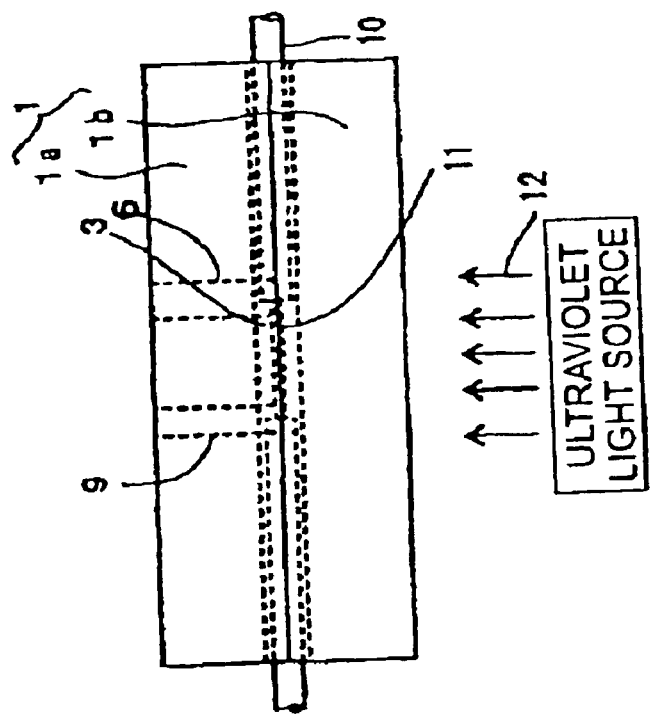
FIG. 4A is a front view showing a state where a reinforcement resin coating is molded by using the molding die shown in FIGS. 1A to 1D.

Then, the upper die 1a is set (S107). Here, as shown in FIG. 3B, the upper die 1a is assembled to an upper frame 23 while in a state where its position is adjusted. The upper frame 23 is provided with a groove 23a in which the optical fiber is disposed. The lower frame 21 and the upper frame 23 are positioned with respect to each other, and also with respect to the lower die 1b and the upper die 1a. Subsequently, as shown in FIG. 3C, the lower frame 21 and the upper frame 23 are clamped to a frame clamp table 25 while in the positioned state (S109). The lower frame 21 and the upper frame 23 are clamped to the frame clamp table 25 by frame clamps 26. In the state where the lower frame 21 and the upper frame 23 are clamped to the frame clamp table 25, as shown in FIGS. 4A and 4B, the upper die 1a and the lower die 1b are clamped, whereby the part of optical fiber 10 including the portion where the end faces of glass optical fibers 11 are fusion-spliced is inserted into the cavity 3 constituted by the grooves 2c, 2d of the upper die 1a and lower die 1b, such that one of the coating ends of the optical fiber junction is located near the resin injection gate 4, whereas the other coating end is located near the resin exit gate 7.

Then, by way of the runner 5 and resin injection gate 4, a UV-curable resin is injected from the sprue 6 into the void surrounding the glass optical fiber within the cavity 3 (S111). At this time, the air existing about the glass optical fiber 11 and the resin at the front end portion of the resin flow are discharged by way of the runner 8 and resin exit hole 9 from the resin exit gate 7 positioned near the other coating end. Then, at the point in time when the surroundings of the glass optical fiber 11 are sufficiently filled with the UV-curable resin, an ultraviolet light 12 is emitted to the lower die 1b from therebelow as shown in FIGS. 4A and 4B, whereby the filling UV-curable resin is cured with the ultraviolet light 12 having transmitted through the lower die 1b and reached the resin (S113). Thereafter, the frame clamps 26 and fiber clamps 22 are removed, and the optical fiber 10 is taken out (S115).

Figure 5:
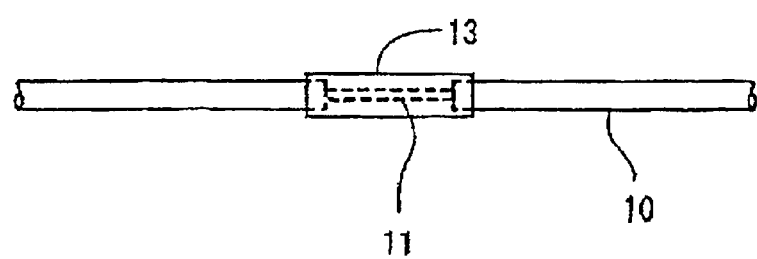
FIG. 5 is a front view showing an optical fiber junction after molding.

Consequently, in the optical fiber junction, the exposing portion of the glass optical fiber 11 in the optical fiber 10 is covered with a reinforcement resin coating 13 made of the UV-curable resin as shown in FIG. 5. While the optical fiber 10 has an outer diameter of about 245 µm, the reinforcement resin coating has an outer diameter of about 250 µm. Since the outer diameter difference therebetween is very small, i.e., several micrometers, the size of the optical fiber junction becomes no obstacle when processing an outer coating to the combined optical fiber or accommodating the optical fiber into the optical fiber cable.

Since there is a slight gap between the coating of the optical fiber 10 and the inner wall face of its corresponding groove, the resin intrudes the gap over a length of about 0.5 mm, thereby forming a part where the reinforcement resin coating 13 overlies the coating of the optical fiber 10 over a length of about 0.5 mm at the coating end of the optical fiber 10. When this overlying part is made, no gap occurs between the reinforcement resin coating 13 and the coating end of the optical fiber 10 even if the optical fiber junction is bent. It will be sufficient if the thickness of the reinforcement resin coating in the overlying part is at least 1 µm.

FIGS. 6A to 6C show an example in which the molding die is provided with a UV-light-blocking layer and a UV-nonreflecting layer. In FIGS. 6A to 6C, 14 and 15 indicate UV-light-blocking layers, whereas 16 indicates a UV-nonreflecting layer. Though FIG. 6A depicts the resin injection gate 4, runner 5, sprue 6, resin exit gate 7, runner 8, resin exit hole 9, optical fiber 10, glass optical fiber 11, and UV-nonreflecting layer 16 with imaginary lines, they are not provided in the lower die 1b. They are depicted imaginarily so as to clarify the relationship between the position where the resin injection gate 4 is located and the like and the position where the UV-light-blocking layer 14 provided in FIG. 6A is located when lower die 1b shown in FIG. 6A and the upper die 1a shown in FIGS. 1A and 1B are clamped together while the latter is mounted on the former.

As shown in FIGS. 6A to 6C, the UV-light-blocking layers 14, 15 are provided in a part of the respective parting faces 2a and 2b of the upper die 1a and lower die 1b so as to extend along the parting faces. Each of the UV-light-blocking layers 14, 15 is a metal film of aluminum or the like, or a multilayer film of dielectrics such as silicon dioxide ($SiO_2$) and titanium oxide ($TiO_2$), silicon dioxide ($SiO_2$) and tantalum oxide ($T_2O_5$), and the like, which can block the ultraviolet light having a wavelength involved in the curing of the injected UV-curable resin, and is formed by sputtering, vacuum deposition, and the like. Its thickness is several micrometers. When a dielectric multilayer film is formed on a parting face, a film having a high bonding strength can be formed and can be kept from peeling off even upon repeated clamping operations of the molding die. When the material and thickness of each layer in the dielectric multilayer film a readjusted, a UV-light-blocking layer which prevents the ultraviolet light from being transmitted therethrough can be made.

The UV-light-blocking layers 14, 15*a* repositioned such that, when the upper die 1*a* or lower die 1*b* is seen from the parting face 2*a*, 2*b* side, at least peripheral portions of the resin injection gate 4, runner 5, resin exit gate 7, and runner 8 in contact with the groove 2*c*, 2*d* are covered with the UV-light-blocking layers 14, 15. Here, the grooves 2*c*, 2*d* are not provided with the UV-light-blocking layers 14, 15. More preferably, as shown in FIG. 6A, all of the resin injection gate 4, runner 5, sprue 6, resin exit gate 7, runner 8, and resin exit hole 9 are hidden by the UV-light-blocking layers 14, 15. Though the UV-light-blocking layers 14, 15 are also formed in wall face portions of the grooves of the runners 5, 8, it is not necessary to form the UV-light-blocking layers 14, 15 such that they extend to the wall faces of the sprue 6 and resin exit hole 9.

Though FIGS. 6A to 6C show an example in which only parts of the parting faces 2*a*, 2*b* of the upper die 1*a* and lower die 1*b* excluding their respective grooves 2*c*, 2*d* are provided with the UV-light-blocking layers 14, 15, all the surfaces of the parting faces 2*a*, 2*b* may be provided with the UV-light-blocking layers 14, 15 as well. If the grooves 2*c*, 2*d* are formed by grinding after the parting faces 2*a*, 2*b* are formed with the UV-light-blocking layers 14, 15, materials of the UV-light-blocking layers 14, 15 can be prevented from inconveniently adhering to the wall faces within the grooves 2*c*, 2*d* and partly shielding the cavity 3 from light.

Also, since the UV-curable resin injected into the cavity 3 is irradiated with the ultraviolet light by way of the lower die 1*b*, the UV-light-blocking layers 14, 15 block light except for the grooves 2*c*, 2*d*. Since at least the UV-curable resin seeping into the gap between the parting faces 2*a*, 2*b* of the upper die 1*a* and lower die 1*b* and the resin at the positions in contact with the grooves 2*c*, 2*d* of the runners 5, 8 are not irradiated with the ultraviolet light, the resin remains uncured in these portions. Therefore, when the optical fiber junction is taken out after molding, it is taken out while the uncured portions remain adhering to the surface of the reinforcement resin coating 13. Since the resin is uncured and has a fluidity, the uncured portions of resin can easily be wiped off with cloth and the like.

Since the ultraviolet light irradiating the cavity 3 constituted by the grooves 2*c*, 2*d* is not blocked, it is transmitted through the resin to reach the upper die 1*a* and then may be reflected by the outer face portion of the upper die so as to return to the cavity 3 and its surroundings. If the parting face 2*a* of the upper die 1*a* is formed with the UV-light-blocking layer 15, the UV-curable resin seeping between the parting faces 2*a*, 2*b* will not be cured by reflected light of the ultraviolet light.

If the UV-nonreflecting layer 16 made of a dielectric multilayer film or the like is provided on the outer face (ultraviolet light exit surface) of the upper die 1*a* (the die that dose not have said UV-light-blocking layer 14 thereon) so that no reflection of the ultraviolet light occurs there, the UV-curable resin seeping between the parting faces will not cure even when the parting face 2*a* of the upper die 1*a* is not formed with the UV-light-blocking layer 15. The forming of the UV-light-blocking layers 14, 15 onto the parting faces of the upper die 1*a* and lower die 1*b* and the forming of the UV-nonreflecting layer 16 onto the outer face of the upper die 1*a* may be effected together in order to securely prevent the part of the parting faces other than the grooves 2*c*, 2*d* from being irradiated with the ultraviolet light, as a matter of course.

While the UV-curable resin within the grooves 2*c*, 2*d* cures in response to the irradiation with the ultraviolet light, the resin within the runners 5, 8 linked to the resin injection gate 4 and resin exit gate 7 is in an uncured state which is easy to flow. Therefore, even when the UV-curable resin within the grooves 2*c*, 2*d* shrinks its volume by about 10% upon curing, a negative pressure is formed within the grooves 2*c*, 2*d*, whereby the resin within the runners 5, 8 flows toward the grooves 2*c*, 2*d*. This refills the grooves 2*c*, 2*d* with the resin, thus making it possible to suppress the occurrence of a gap which is likely to occur between the reinforcement resin coating 13 and the glass optical fiber 11 upon the volumetric shrinkage at the time of curing the resin.

With reference to FIGS. 7A to 7D, another embodiment of the molding die in accordance with the present invention will now be explained.

Along a parting face 2*a* of an upper die 1*a*, a linear groove 2*c* having a semicircular lateral cross section is provided, whereas two resin injection gates 4 and one resin exit gate 7 located at the center therebetween are provided so as to communicate with the groove 2*c*. Runners 5 and a sprue 6 are provided so as to communicate with the resin injection gates 4, whereas a runner 8 and a resin exit hole 9 are provided so as to communicate with the resin exit gate 7.

When a reinforcement resin is to be molded by using this molding die 1, an optical fiber 10 is inserted into the cavity 3 as indicated by imaginary lines in FIGS. 7A to 7D. Therefore, the resin injection gates 4 and the resin exit gate 7 are disposed so as to match the coating position of the optical fiber 10 assumed to be inserted and the like. Namely, as shown in FIGS. 7A and 7C, the two resin injection gates 4 are positioned near the respective coating ends of the optical fiber 10 assumed to be inserted. In a specific example in which the exposing length of the glass optical fiber 11 in the optical fiber junction is about 9 mm, the center distance between the two resin injection gates 4 is set to about 9 to 10 mm.

Though the center distance between the two resin injection gates 4 may be set to 9 mm in conformity to the exposing length of the glass optical fiber 11, so that the resin injection gates 4 align with the respective coating end positions of the optical fiber 10, it is more preferred that the center distance between the two resin injection gates 4 be made slightly greater so as to become about 10 mm such that each resin injection gate 4 is disposed at a position which is shifted by about 0.5 mm from the coating end toward the coating. In this case, since the distance between the resin injection gate 4 and the coating end of the optical fiber is about 0.5 mm, the resin injected from the resin injection gate 4 passes through the gap between the coating of the optical fiber 10 and the inner wall face of the grooves 2*c*, 2*d*, thereby flowing toward the surroundings of the exposing portion of the glass optical fiber 11. As a consequence, even when there are some fluctuations in the exposing length of the glass optical fiber 11 of the optical fiber 10, it can securely be filled with a resin to the vicinity of the coating ends, whereby a part covered with the resin having a length of about 0.5 mm can be formed.

The resin exit gate 7 is disposed at the center between the two resin injection gates 4. The runners 5 and 8 are disposed along the parting face 2*a* so as to communicate with the resin injection gates 4 or resin exit gate 7, and with the sprue 6 for injecting the UV-curable resin or the resin exit hole 9 for discharging the UV-curable resin. The positions of the runners 5 and 8, and the positions of the sprue 6 and resin exit hole 9 are not limited to those shown in FIG. 7A.

Though the side on which the resin injection gates 4 are arranged and the side on which the resin exit gate 7 is disposed oppose each other with respect to the groove 2*c* in FIG. 7A, they may be placed on the same side as well. The sizes of the resin exit gate 7, runner 8, and resin exit hole 9 are set appropriately in view of the viscosity of the resin and the like such that the pressure of the resin injected into the cavity 3 does not become too low.

FIGS. 8A and 8B are views showing a state where a reinforcement resin coating is molded by using the molding die 1 shown in FIGS. 7A to 7D. When forming the reinforcement resin coating in the optical fiber junction, as shown in FIGS. 8A and 8B, the part of optical fiber 10 including the portion where end faces of glass optical fibers 11 are fusion-spliced is inserted into the cavity 3 constituted by the grooves 2*c*, 2*d* of the upper die 1*a* and lower die 1*b*, and the upper die 1*a* and lower die 1*b* are clamped together. Subsequently, by way of the runner 5 and resin injection gates 4, the UV-curable resin is injected from the sprue 6 into the void surrounding the glass optical fiber 11 within the cavity 3. As a consequence, the air existing about the glass optical fiber 11 and the resin in the front end portion of the resin flow are discharged from the resin exit gate 7 by way of the runner 8 and resin exit hole 9. At the point in time when the surroundings of the glass optical fibers are fully filled with the UV-curable resin, the lower die 1*b* is irradiated with the ultraviolet light 12 from therebelow, whereby the filling UV-curable resin is cured by the ultraviolet light 12 having reached the resin after being transmitted through the lower die 1*b*. Consequently, as shown in FIG. 5, the exposing portion of the glass optical fiber 11 of the optical fiber 10 in the optical fiber junction is covered with the reinforcement resin coating 13 made of the UV-curable resin.

Figure 9:
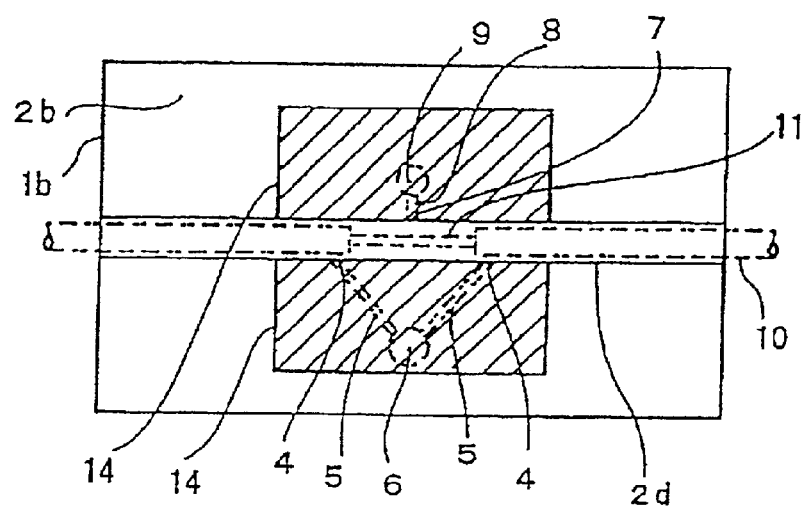
FIG. 9 is a view showing an example in which the molding die in accordance with the present invention is provided with a UV-light-blocking layer and a UV-nonreflecting layer, which is a plan view of the lower die as seen from its parting face side.

FIG. 9 is a plan view of the lower die showing an example in which the lower die of a molding die is provided with a UV-light-blocking layer. Though FIG. 9 depicts resin injection gates 4, runners 5, a sprue 6, a resin exit gate 7, a runner 8, and a resin exit hole 9 with imaginary lines, they are not provided in the lower die 1*b*. They are depicted imaginarily so as to clarify the relationship between the positions where the resin injection gates 4 and the like are located and the position where the UV-light-blocking layer 14 provided in FIG. 9 is located when lower die 1*b* shown in FIG. 9 and the upper die 1*a* shown in FIGS. 1A and 1B are clamped together while the latter is mounted on the former.

As shown in FIG. 9, the UV-light-blocking layer 14 is provided in a part of the parting face 2*b* of the lower die 1*b* so as to extend along the parting face 2*b*. The UV-light-blocking layer 14 is positioned such that, when the upper die 1*a* side is seen from the lower die 1*b* side, at least the peripheral portions of the resin injection gates 4, runners 5, resin exit gate 7, and runner 8 of the upper die 1*a* in contact with the groove 2*d* are hidden by the UV-light-blocking layer 14. More preferably, as shown in FIG. 9, all of the resin injection gates 4, runners 5, sprue 6, resin exit gate 7, runner 8, and resin exit hole 9 are hidden by the UV-light-blocking layer 14. Also, all the surface of the parting face 2*b* in the lower die 1*b* excluding the groove 2*d* may be provided with the UV-light-blocking layer 14. If the groove 2*d* is formed by grinding after the parting face 2*b* is formed with the UV-light-blocking layer 14, materials of the UV-light-blocking layer 14 can be prevented from inconveniently adhering to the wall face within the groove 2*d* and partly shielding the cavity 3 from light.

As shown in FIG. 6B, the upper die 1*a* has the UV-light-blocking layer 15. The UV-light-blocking layer 15 is provided in a part of the parting faces 2*a* of the upper die 1*a* so as to extend along the parting faces. The UV-light-blocking layer 15 is positioned such that, when the lower die 1*b* side is seen from the upper die 1*a* side, at least peripheral portions of the resin injection gate 4, runner 5, resin exit gate 7, and runner 8 in contact with the groove 2*c* are covered with the UV-light-blocking layers 14, 15. Here, the groove 2*c* is not provided with the UV-light-blocking layer 15. More preferably, all of the resin injection gate 4, runner 5, sprue 6, resin exit gate 7, runner 8, and resin exit hole 9 are hidden by the UV-light-blocking layer 15. Though the UV-light-blocking layer 15 is also formed in wall face portions of the grooves of the runners 5, 8, it is not necessary to form the UV-light-blocking layer 15 such that they extend to the wall faces of the sprue 6 and resin exit hole 9. Also, all the surface of the parting face 2*a* in the upper die 1*a* excluding the groove 2*c* may be provided with the UV-light-blocking layer 15. If the groove 2*c* is formed by grinding after the parting face 2*a* is formed with the UV-light-blocking layer 15, materials of the UV-light-blocking layer 15 can be prevented from inconveniently adhering to the wall face within the groove 2*c* and partly shielding the cavity 3 from light.

As shown in FIGS. 6A and 6B, if the UV-nonreflecting layer 16 made of a dielectric multilayer film or the like is provided on the outer face (ultraviolet light exit surface) of the upper die 1*a* (the die that dose not have said UV-light-blocking layer 14 thereon) so that no reflection of the ultraviolet light occurs there, the UV-curable resin seeping between the parting faces will not cure even when the parting face 2*a* of the upper die 1*a* is not formed with the UV-light-blocking layer 15. The forming of the UV-light-blocking layers 14, 15 onto the parting faces of the upper die 1*a* and lower die 1*b* and the forming of the UV-nonreflecting layer 16 onto the outer face of the upper die 1*a* may be effected together in order to securely prevent the part of the parting faces other than the grooves 2*c*, 2*d* from being irradiated with the ultraviolet light, as a matter of course.

Figure 10A:
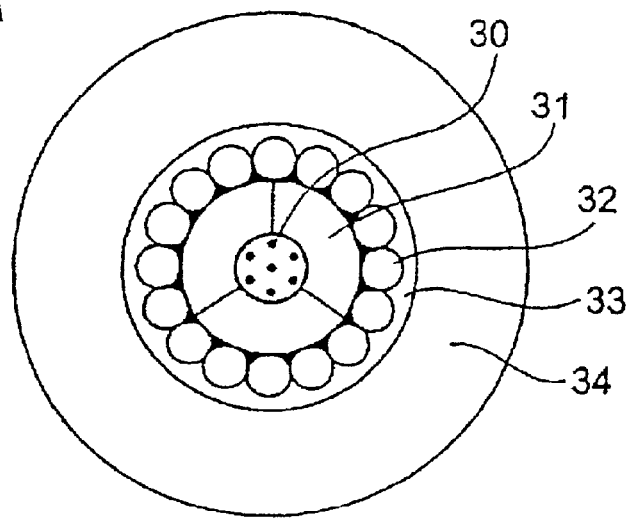
FIG. 10A is a view showing the cross-sectional structure of an embodiment of the optical fiber cable in accordance with the present invention.
Figure 10B:
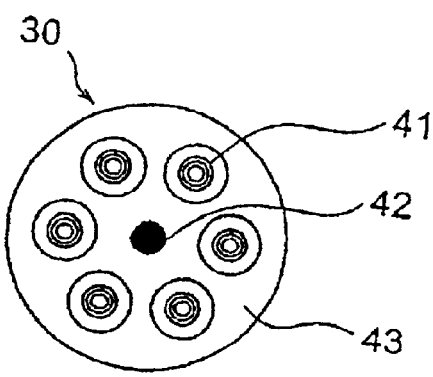
FIG. 10B is a view showing the cross-sectional structure of an optical fiber unit included in the embodiment of the optical fiber cable in accordance with the present invention.
Figure 10C:
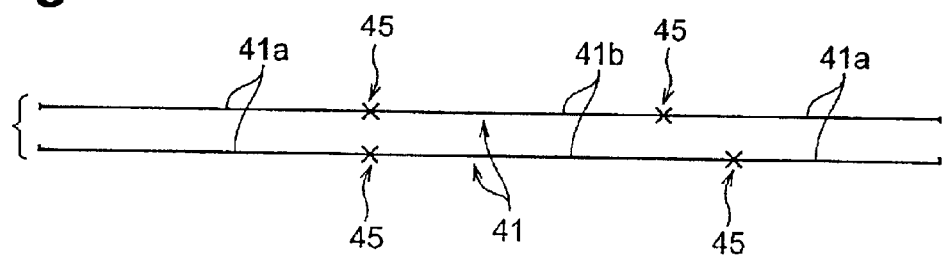
FIG. 10C is a view showing the structure of an optical fiber transmission line included in the embodiment of the optical fiber cable in accordance with the present invention.
Figure 11A:
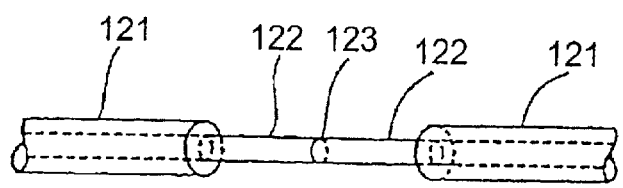
FIG. 11A is a perspective view for explaining an optical fiber junction, showing a state where glass optical fibers in optical fibers are fusion-spliced.
Figure 11B:
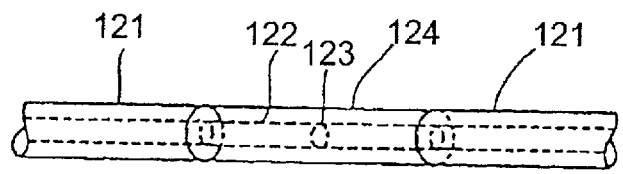
FIG. 11B is a perspective view for explaining the optical fiber junction, showing a state where the junction is provided with a reinforcement resin coating.

With reference to FIGS. 10A to 10C, an embodiment of the optical fiber cable in accordance with the present invention will now be explained.

As shown in FIG. 10A, the optical fiber cable is constructed by successively providing a three-part metal tube 31, high-tension steel twisted lines 32, a copper tube 33, and an insulated polyethylene layer 34 on the outer periphery of an optical fiber unit 30 holding a plurality of optical fiber transmission lines. Here, as shown in FIG. 10B, the optical fiber unit 30 has a structure in which a plurality of optical fiber transmission lines 41 are secured about a tension member 42 by way of a buffer layer (unit filling resin) 43.

As shown in FIG. 10C, each optical fiber transmission line 41 is constituted by single-mode optical fibers (SMFs) 41*a* and dispersion-compensating optical fibers (DCFs) 41*b*. Each single-mode optical fiber 41*a* has a chromatic dispersion of about 20 ps/nm/km, whereas each dispersion-compensating optical fiber 41*b* has a chromatic dispersion of about −4520 ps/nm/km.

The single-mode optical fiber 41*a* and the dispersion-compensating optical fiber 41*b* form an optical fiber junction 45 as shown in FIGS. 4A and 4B or FIGS. 8A and 8B. Thus, the optical fiber cable accommodates therein at least one optical fiber transmission line 41 (optical fiber) having the optical fiber junction 45 formed as shown in FIGS. 4A and 4B or FIGS. 8A and 8B in a part thereof in the longitudinal direction.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for molding a reinforcement resin coating of a glass optical fiber exposing portion of an optical fiber junction comprising the steps of:

using a molding die constituted by upper and lower dies at least one of which is made of a material transparent to an ultraviolet light, said molding die having a cavity constituted by grooves of said upper and lower dies linearly penetrating therethrough along respective parting faces thereof, each groove having a semicircular lateral cross section, said molding die having a resin injection gate and a resin exit gate communicating with said cavity, said resin injection gate is not positioned at a center of said cavity in a longitudinal direction thereof;

inserting fusion-spliced optical fibers including said glass optical fiber exposing portion in which end faces of glass optical fibers exposed by removing a coating at end parts of two optical fibers are butted against each other and said exposed end parts are fusion-spliced into said cavity of said molding die;

positioning one coating end of said fusion-spliced optical fibers near said resin injection gate so that a fusion-spliced point of said fusion-spliced optical fibers is not opposed to said resin injection gate;

positioning the other coating end of said fusion-spliced optical fibers near said resin exit gate so that said fusion-spliced point of said fusion-spliced optical fibers is not opposed to said resin exit gate;

injecting a UV-curable resin into a void surrounding said glass optical fibers within said cavity from said resin injection gate;

and then emitting said ultraviolet light through said die made of said UV-curable resin from the outside of said molding die, so as to cure said UV-curable resin injected into said cavity and form a reinforcement resin coating, wherein said parting face of said upper and lower level dies are provided with an UV-light-blocking layer extending along a part of said parting face including a position in contact with said groove in a segment including said resin injection gate and said resin exit gate, said UV-light-blocking layer is not formed on said grooves.

2. A method for molding a reinforcement resin coating of a glass optical fiber exposing portion of an optical fiber junction comprising the steps of:

using a molding die constituted by upper and lower dies at least one of which is made of a material transparent to an ultraviolet light, said molding die having a cavity constituted by grooves of said upper and lower dies linearly penetrating therethrough along respective parting faces thereof, each groove having a semicircular lateral cross section, said molding die having a resin injection gate and a resin exit gate communicating with said cavity, said resin injection gate is not positioned at a center of said cavity in a longitudinal direction thereof;

inserting fusion-spliced optical fibers including said glass optical fiber exposing portion in which end faces of glass optical fibers exposed by removing a coating at end parts of two optical fibers are butted against each other and said exposed end parts are fused-spliced into said cavity of said molding die;

positioning one coating end of said fusion-spliced fibers near said resin injection gate so that a fusion-spliced point of said fusion-spliced optical fibers is not opposed to said resin injection gate;

positioning the other coating end of said fusion-spliced optical fibers near said resin exit gate so that fusion-spliced point of said fusion-spliced optical fibers is not opposed to said resin exit gate;

injecting a UV-curable resin into a void surrounding said glass optical fibers within said cavity from said resin injection gate;

and then emitting said ultraviolet light through said die made of said UV-curable resin from the outside of said molding die, so as to cure said UV-curable resin injected into said cavity and form a reinforcement resin coating, wherein said parting face of said upper and lower dies are provided with an UV-light-blocking layer extending along a part of said parting face including a position in contact with said groove in a segment including said resin injection gate and said resin exit gate, said UV-light-blocking layer is not formed on said grooves.

3. A molding apparatus for a reinforcement resin coating of a glass optical fiber exposing portion of an optical fiber junction comprising a molding die and an ultraviolet light source, said molding die comprising upper and lower dies at least one of which is made of a material transparent to an ultraviolet light emitted from said ultraviolet light source, said molding die having a cavity constituted by grooves of said upper and lower dies linearly penetrating therethrough along respective parting faces thereof, each groove having a semicircular cross section, said molding die being provided with a resin injection gate and a resin exit gate on said cavity, wherein said resin injection gate positioned near one coating end of fusion-spliced optical fibers inserted into said cavity so that a fusion-spliced point of said fusion-spiced optical fibers is not opposed to said resin injection gate;

wherein said resin gate is positioned near the other coating end of fusion-spliced optical fibers inserted into said cavity so that the said fusion-spliced point of said fusion-spliced optical fibers is not opposed to said resin exit gate; and wherein said parting faces of said upper and lower dies are provided with a UV light-blocking layer extending along a part of said parting face including a position in contact with said grooves in a segment including said resin injection gate and said resin exit gate, said UV light-blocking layer is not formed on said grooves.

4. A molding apparatus for a reinforcement resin coating of a glass optical fiber exposing portion of an optical fiber junction comprising a molding die and an ultraviolet light source, said molding die comprising upper and lower dies at least one of which is made of a material transparent to an ultraviolet light emitted from said ultraviolet light source, said molding die having a cavity constituted by grooves of said upper and lower dies linearly penetrating therethrough along respective parting faces thereof, each groove having a semicircular cross section, said molding die being provided with a resin injection gate and a resin exit gate on said cavity, wherein said resin injection gate is positioned near one coating end of fusion-spliced optical fibers inserted into said cavity so that a fusion-spliced point of said fusion-spliced optical fibers is not opposed to said resin injection gate;

wherein said resin exit gate is positioned near the other coating end of fusion-spliced optical fibers inserted into said cavity so that said fusion-spliced point of said fusion-spliced optical fibers is not opposed to said resin injection gate;

wherein said resin exit gate is positioned near the other coating end of fusion-spliced optical fibers inserted into said cavity so that said fusion-spliced point of said fusion-spliced optical fibers is not opposed to said resin exit gate; and wherein said parting face of said die irradiated with said ultraviolet light provided with a UV-light-blocking layer extending along a part of said parting face including a position in contact with said grooves in a segment including said resin injection gate and said resin exit gate, said UV-light-blocking layer is not formed on said grooves.

5. A molding apparatus for a reinforcement resin coating of a glass optical fiber exposing portion of an optical fiber junction comprising a molding die and an ultraviolet light source, said molding die comprising upper and lower dies at least one of which is made of a material transparent to an ultraviolet light emitted from said ultraviolet light source, said molding die having a cavity constituted by grooves of said upper and lower dies linearly penetrating therethrough along respective parting faces thereof, each groove having a semicircular cross section, said molding die being provided with a resin injection gate and a resin exit gate on said cavity, wherein said resin injection gate is positioned near one coating end of fusion-spliced optical fibers inserted into said cavity so that a fusion-spliced point of said fusion-spliced optical fibers is not opposed to said resin injection gate; and wherein said resin exit gate is positioned near the other coating end of fusion-spliced optical fibers inserted into said cavity so that said fusion-spliced point of said fusion-spliced optical fibers is not opposed to said resin exit gate; and wherein said resin exit gate is positioned near the other coating end of fusion-spliced optical fibers inserted into said cavity so that said fusion-spliced point of said fusion-spliced optical fibers is not opposed to said resin exit gate; and wherein said resin injection gate and said resin exit gate are positioned on the parting faces of either one of the upper and lower dies opposite from each other with respect to said groove.

6. A molding apparatus for a reinforcement resin coating of a glass optical fiber exposing portion of an optical fiber junction comprising a molding die and an ultraviolet light source, said molding die comprising upper and lower dies at least one of which is made of a material transparent to an ultraviolet light emitted from said ultraviolet light source, said molding die having a cavity constituted by grooves of said upper and lower dies linearly penetrating therethrough along respective parting faces thereof, each groove having a semicircular cross section, said molding die being provided with a resin injection gate and a resin exit gate on said cavity, wherein said resin injection gate is positioned near one coating end of fusion-spliced optical fibers inserted into said cavity so that a fusion-spliced point of said fusion-spliced optical fibers is not opposed to said resin injection gate; and wherein said resin exit gate is positioned near the other coating end of fusion-spliced optical fibers inserted into said cavity so that said fusion-spliced point of said fusion-spliced optical fibers is not opposed to said resin exit gate; and wherein said parting face of said die irradiated with said ultraviolet light is provided with a UV light-blocking layer extending along a part of said parting face including a positioned in contact with said groove in a segment including said resin injection gate and said resin exit gate, said UV light-blocking layer is not formed on said groove; and wherein the other die has a UV-nonreflecting layer on an ultraviolet light exit surface.

7. A molding apparatus for a reinforcement resin coating of a glass optical fiber exposing portion of an optical fiber junction comprising a molding die and an ultraviolet light source, said molding die comprising upper and lower dies at least one of which is made of a material transparent to an ultraviolet light emitted from said ultraviolet light source, said molding die having a cavity constituted by grooves of said upper and lower dies linearly penetrating therethrough along respective parting faces thereof, each groove having a semicircular cross section, said molding die being provided with a resin injection gate and a resin exit gate on said cavity, wherein said resin injection gates are not disposed at a center of said cavity in a longitudinal direction thereof, but are disposed near coating ends of said fusion-spliced optical fibers so that a fusion-spliced point of said fusion-spliced optical fivers is not opposed to said two resin injection gates, respectively;

wherein said resin exit gate is disposed on said cavity located at a center between said two resin injection gates; and wherein said resin injection gate and said resin exit gate are positioned on the parting face of either one of the upper and lower dies opposite from each other with respect to said groove.

8. A molding apparatus for a reinforcement resin coating of a glass optical fiber exposing portion of an optical fiber junction according to claim 7, wherein said parting faces of said upper and lower dies are provided with a UV light-blocking layer extending along a part of said parting face including a position in contact with said grooves in a segment including said resin injection gate and said resin exit gate, said UV light-blocking layer is not formed on said grooves.

9. A molding apparatus for a reinforcement resin coating of a glass optical fiber exposing portion of an optical fiber junction according to claim 7, wherein said parting face of said die irradiated with said ultraviolet light is provided with a UV light-blocking layer extending along a part of said parting face including a position in contact with said groove in a segment including said resin injection gates at two positions, said UV-light-blocking layer is not formed on said groove.

10. A molding apparatus for a reinforcement resin coating of a glass optical fiber exposing portion of an optical fiber junction according to claim 7, said molding die having a sprue, a runner communicated between said sprue to said resin injection gate, a resin exit hole, and a runner communicated between said resin exit gate to said resin exit hole, said runners are disposed so as to extend along said parting face.

* * * * *